United States Patent Office
3,113,976
Patented Dec. 10, 1963

3,113,976
3-(PENTAFLUOROPHENYL)-PROPENE-1 AND
ITS PREPARATION
Michael William Buxton, Avonmouth, Bristol, and John Colin Tatlow, Edgbaston, Birmingham, England, assignors to The National Smelting Company Limited, London, England
No Drawing. Filed May 9, 1961, Ser. No. 108,729
Claims priority, application Great Britain May 12, 1960
2 Claims. (Cl. 260—650)

This invention relates to olefins and more especially olefins with a pentafluorophenyl group attached at some point in the molecule.

The invention consists in a new olefin containing a pentafluorophenyl nucleus attached to a two or three carbon chain, 3-(pentafluorophenyl)-propene-1 and 2,3,4,5,6-pentafluoro-α-methyl styrene.

The invention further consists in a method of preparing 3-(pentafluorophenyl)-propene-1 by reacting a pentafluorophenyl magnesium halide, preferably the bromide or iodide, with allyl bromide in ethereal solution.

This 3-(pentafluorophenyl)-propene-1 may be reacted preferably in carbon tetrachloride solution, with bromine, to give 1:2 dibromo 3-pentafluorophenyl propane.

The invention still further consists in a method of preparing 2,3,4,5,6-pentafluoromethylstyrene by the dehydration of dimethyl (pentafluorophenyl) methanol, which is conveniently prepared by the action of acetone on the pentafluorophenyl Grignard reagent.

The preparation of a similar olefin, namely 2,3,4,5,6-pentafluorostyrene has been described recently (W. J. Pummer and L. A. Wall, J. Res. Nat. Bureau of Standards, 63A, No. 2. Sept.-Oct. 1959, p 167; E. Nield, R. Stephens and J. C. Tatlow, J.C.S., p. 166).

The invention may be further described with reference to the following examples.

Example 1

3-(pentafluorophenyl)-propene-1 was synthesised in yields up to about 86% by reaction of an ethereal solution of pentafluorophenyl magnesium halide ($C_6F_5MgX$, where X=Br or I) with allyl bromide. The olefin is a colourless liquid, B.P. 150° C. Nuclear magnetic resonance measurements confirm that the structure of the olefin is $C_6F_5CH_2CH=CH_2$, and are not compatible with the formula of the isomer, namely $C_6F_5CH=CH-CH_3$.

This new olefin is a valuable chemical intermediate. For example it undergoes typical olefin reactions such as oxidation and addition of bromine, hydrogen halides or the elements of water at the double bond in the side chain. The olefin may also be useful as a monomer in the production of specialised plastics and resins.

Example 2

Addition of bromine to the side-chain double bond was carried out in carbon tetrachloride solution at 20° C., and proceeded readily to give 1:2-dibromo-3-(pentafluorophenyl)-propane, B.P. 162–4°/5 cm. Found: C, 29.2; H, 1.2%. Calc. for $C_9H_5Br_2F_5$: C, 29.35; H, 1.4%.

We claim:
1. 3-(pentafluorophenyl)-propene-1.
2. A method of preparing 3-(pentafluorophenyl)-propene-1 in which the pentafluorophenyl Grignard reagent is reacted with allyl bromide in ethereal solution.

References Cited in the file of this patent
UNITED STATES PATENTS
2,475,423    Dickey et al. _____ July 5, 1949

OTHER REFERENCES

Kharasch et al:. Grignard Reactions of Nonmetallic Substances (1954), page 1159, Prentice-Hall, New York, N.Y.

Nield et al.: J. Chem. Soc. (London), 1959, page 170.

Talalayeva et al.: "Izvestia Akad. Nauk, USSR." (1959), pages 65–70.

Prober: "Jour. Am. Chem. Soc.," vol. 75 (1953), pages 968–73.